June 18, 1968 D. M. HART ET AL 3,389,382

ELECTRON BEAM READOUT OF STORED INFORMATION

Filed April 27, 1964

INVENTOR.
DONALD M. HART
JOSEPH R. WERNING

BY Elmer Galbraith

ATTORNEY

United States Patent Office 3,389,382

Patented June 18, 1968

3,389,382

ELECTRON BEAM READOUT OF STORED INFORMATION

Donald Mills Hart, Los Gatos, and Joseph Robert Werning, San Jose, Calif., assignors to International Business Machines Corporation, New York, N.Y., a corporation of New York Filed Apr. 27, 1964, Ser. No. 362,599
3 Claims. (Cl. 340—173)

ABSTRACT OF THE DISCLOSURE

An information storage system wherein information is stored in the form of a pattern of different materials. Information is read by scanning the pattern of different materials with an electron beam and detecting the number of backscattered electrons. In order to prevent the accumulation of charge on the pattern of different materials, the pattern is either made out of a conductive material, or it is coated with a thin layer of conductive material.

This invention relates to information storage systems and more particularly to reading information using a scanning electron beam.

Copending patent application Ser. No. 362,613 by D. M. Hart, entitled, "Electron Beam Readout of Thermoplastic Recording," now issued U.S. Patent 3,328,777 June 27, 1967, and copending patent application, Ser. No. 362,614 by C. H. Ting, entitled "Thermoplastic Recording," now issued U.S. Patent 3,308,444 Mar. 7, 1967, both of which are assigned to the assignee of the present invention, show information storage systems wherein information stored in the form of a deformation pattern is read using an electron beam. The present invention is directed to reading information from a record which has information stored thereon in the form of a pattern consisting of a plurality of different materials.

An object of the present invention is to provide an improved information storage device.

A further object of the present invention is to provide an improved device for reading information stored in the form of a pattern of different materials.

Yet another object of the present invention is to provide an information storage device for reading and displaying information stored in the form of a pattern of different materials.

Still another object of the present invention is to provide an enlarged display of information stored in the form of a pattern of different materials.

The foregoing and other objects, features and advantages of the invention will be apparent from the following more particular description of preferred embodiments of the invention, as illustrated in the accompanying drawings.

Figure 1:
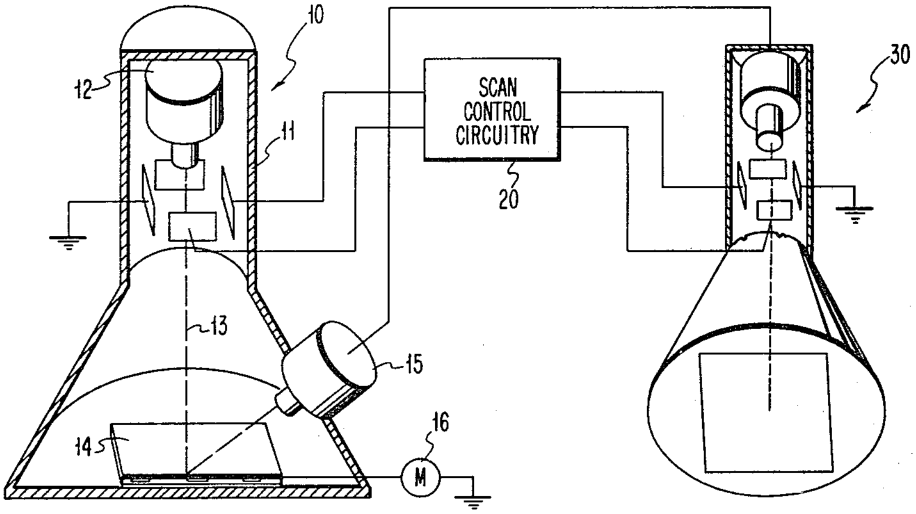
FIGURE 1 shows a first preferred embodiment of the present invention.
Figure 2:
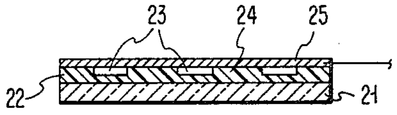
FIGURE 2 shows an enlarged cross sectional view of the information storage area of the device shown in FIGURE 1.

The first preferred embodiment of the invention shown in FIGURE 1 includes information storage device 10, control circuitry 20 and display device 30. Information storage device 10 includes an evacuated envelope 11, an electron gun 12, a record or information storage area 14, a detector 15 and a current meter 16. The details of information storage area 14 are shown in FIGURE 2. It includes a substrate 21, a layer of silver halide film 22 which has unexposed areas 24 and exposed areas 23, and a layer of conductive material 25. An electrical connection is provided between the layer of conductive material 25 through meter 16 to ground. Electron gun 12 generates an electron beam 13 which is incident upon target area 14. The position of electron beam 13 in target area 14 is controlled by scan control circuitry 20. Some electrons from beam 13 are backscattered to detector 15 and the other electrons flow through conductive layer 25 through meter 16 to ground. Layer 25 is very thin and electron beam 13 has sufficient energy to penetrate through layer 25 to layer 22. However, since layer 25 is conductive it prevents the accumulation of any charge due to electron beam 13.

The number of electrons which are backscattered to detector 15 depends upon the atomic number of the material whereon the electron beam is incident. The exposed areas 24 have a high silver content and the unexposed areas 23 have a relatively low silver content. Thus, the number of backscattered electrons depends upon whether the beam is incident upon one of the exposed areas 23 or upon one of the unexposed areas 24 and the magnitude of the output of detector 15 likewise indicates the type of material whereon the electron beam 13 is incident. Since the total number of electrons in beam 13 must either backscatter to detector 15 or flow through meter 16, the indication given by meter 16 also indicates the type of area whereon electron beam 13 is incident.

Output device 30 comprises a conventional cathode ray scope. The intensity of the electron beam in output device 30 is controlled by the output of detector 15 and the $x$ and $y$ deflection of the electron beam in cathode ray scope 30 is controlled by scan control circuitry 20.

Scan control circuitry 20 controls the electron beams in storage device 10 and in output device 30 so that these beams scan record 14 and the face of device 30 similar to the manner that the electron beam in a television tube scans the face of the tube. The scanning of record 14 and of the face of cathode ray scope 30 proceeds synchronously. Circuitry for controlling the motion of electron beams is known; therefore, no further description of scan control circuitry 20 is given.

The image generated on the face of display device 30 accurately reflects the record 14. However, it should be understood that the size of record 14 can be many times smaller than the sice of the image created on the face of output device 30. In the drawings, the image on the face of cathode ray scope 30 is shown substantially the same size as record 14 only for convenience in illustration.

Layer 25 may consist of a vacuum deposited layer of gold which is a few hundred angstroms thick. The layer 22 may consist of a conventional, silver-halide photographic film having exposed areas 24 and unexposed areas 23. Layer 21 may consist of any suitable substrate such as glass.

As previously described, conductive layer 25 prevents the accumulation of charge from electron beam 13 during the reading operation. If the energy of the electron beam is such that the secondary emission ratio is unity (that is, if one electron leaves record 14 for each electron which arrives in beam 13) layer 25 can be eliminated. However, by providing conductive layer 25, it is possible to use an electron beam which has a much higher accelerating potential.

Figure 3:
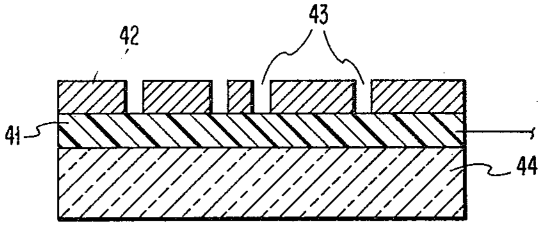
FIGURE 3 shows an alternate preferred embodiment of the present invention.

An alternate preferred embodiment of record 14 is shown in FIGURE 3. It consists of two layers 41 and 42 which are made of different types of material and which are mounted on a substrate 44. In certain places such as the locations designated 43, layer 42 has been machined away such that layer 41 is exposed. Layers 41 and 42 are both conductive material; thus the connection to meet 16 can be made through layer 41.

The operation of the system using the record shown in FIGURE 3 is identical to the operation using the record shown in FIGURE 2. The principle upon which the operation of the system depends is that the number of backscattered electrons depends upon the particular material (i. e., upon the atomic number of the material) whereon the electron beam is incident. Conductive layer 25 is not needed since both layers 41 and 42 are conductive.

The information storage device shown in FIGURE 3 can be made by any conventional technique. If the area is extremely small, micro-machining using an electron beam is probably the best suited technique for its fabrication.

In the particular embodiment shown, layer 41 consists of gold which has a high atomic number and layer 42 consists of a thin layer of aluminum which has a low atomic number. Layer 42 is 10 microns thick and layer 41 is several millimeters thick. Layer 41 could be made thick enough to support layer 42 and in this event substrate 44 could be eliminated. The top layer 42 is made relatively thin so as to insure that changes in the number of backscattered electrons is due almost entirely to the differences in atomic number rather than differences in topography. Layer 42 must, however, be thicker than the penetration depth of the particular material used. The material with the higher atomic number could be put in layer 42 instead of layer 41.

In both the first and the second embodiment the energy of electron beam 13 can be in the order of ten thousand electron volts.

As shown herein, the output is in the form of an image on the face of tube 30. It should be understood that a digital type signal could also be taken directly from the output of detector 18. The evacuated envelope 11 could be either a permanently sealed tube or it could be a tube which has provision for replacing the record 14. In this case, a vacuum pump would be needed to restore the vacuum after the tube is opened.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. An information storage system comprising:

a record having information stored thereon in the form of a pattern formed by different materials, said record including, a layer of film having exposed areas and unexposed areas thereon, a thin conductive coating on said film to prevent the accumulation of charge during the reading operation, means for directing an electron beam at said record; and means for detecting the number of backscattered electrons, whereby an indication is obtained of the type of material whereon said beam is incident thereby indicating the information indicated by said pattern.

2. An information storage system comprising:

a record having information stored thereon in the form of a pattern formed by different materials, said record including, a layer of film having exposed areas and unexposed areas thereon, a thin conductive coating on said film to prevent the accumulation of charge during the reading operation, readout means including means for directing a first electron beam at said record, means for controlling the position of said first electron beam on said record, detecting means for generating a signal indicative of the number of electrons backscattered from said record, a cathode ray scope having an electron beam, means for moving the beam in said cathode ray scope in synchronization with said first electron beam, and means for modulating the electron beam in said cathode ray scope in accordance with the signal generated by said detecting means, whereby an image is generated on the face of said cathode ray scope which indicates the pattern of materials in said record.

3. An information storage system comprising:

a record formed by a sheet of film having exposed areas thereon, means for directing an electron beam at said film;

means for preventing the accumulation of charge on the surface of said film, said means for preventing the accumulation of charge including a thin layer of conductive material on said film, said layer being of insufficient thickness to prevent the electrons in said electron beam from reaching said film, means for detecting the number of backscattered electrons, whereby an indication is obtained of whether said electron beam is incident on an exposed area of certain film or on an unexposed area of said film.

References Cited

UNITED STATES PATENTS

| | | | |
|---|---|---|---|
| 2,297,752 | 10/1942 | Du Mont | 315—12 |
| 2,657,378 | 10/1953 | Gray | 340—345 |
| 2,859,376 | 11/1958 | Kirkpatrick | 315—8.5 |
| 2,901,662 | 8/1959 | Nozick | 315—12 |
| 3,003,110 | 10/1961 | Toulemonde | 328—124 |
| 3,168,726 | 2/1965 | Boblett | 340—173 |

TERRELL W. FEARS, *Primary Examiner.*